(12) United States Patent
Hagedorn et al.

(10) Patent No.: US 11,216,287 B2
(45) Date of Patent: Jan. 4, 2022

(54) SELECTIVE RENDERING MODE

(71) Applicant: Apple Inc., Cupertino, CA (US)

(72) Inventors: Joseph A. Hagedorn, San Francisco, CA (US); Bartosz Ciechanowski, Sunnyvale, CA (US); Chendi Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 15/628,034

(22) Filed: Jun. 20, 2017

(65) Prior Publication Data

US 2018/0349151 A1 Dec. 6, 2018

Related U.S. Application Data

(60) Provisional application No. 62/514,667, filed on Jun. 2, 2017.

(51) Int. Cl.
| | | |
|---|---|---|
| *G06F 9/451* | (2018.01) | |
| *G06F 9/48* | (2006.01) | |
| *G06F 3/0481* | (2013.01) | |

(52) U.S. Cl.
CPC ............ *G06F 9/451* (2018.02); *G06F 3/0481* (2013.01); *G06F 9/4881* (2013.01)

(58) Field of Classification Search
CPC ........ G06F 9/451; G06F 3/0481; G06F 9/488; G06F 3/04883; G06F 3/0482; G06F 9/4881
USPC ...................................................... 715/794
See application file for complete search history.

(56) References Cited

U.S. PATENT DOCUMENTS

| | | | |
|---|---|---|---|
| 8,943,434 B2 * | 1/2015 | Reeves | G06F 3/0481 715/802 |
| 9,146,670 B2 | 9/2015 | Zaman | |
| 9,213,538 B1 * | 12/2015 | Ladd | G06F 8/70 |
| 9,360,989 B2 * | 6/2016 | Maekawa | G06F 3/04883 |
| 9,641,645 B2 | 5/2017 | Levanon | |
| 9,910,884 B2 * | 3/2018 | Churchill | G06F 16/24 |
| 10,261,672 B1 * | 4/2019 | Dolbakian | G06F 3/04883 |
| 2004/0056900 A1 * | 3/2004 | Blume | G06F 3/0481 715/807 |
| 2006/0236322 A1 * | 10/2006 | Brackman | G06F 9/4806 718/103 |
| 2007/0050778 A1 * | 3/2007 | Lee | H04N 5/44591 718/107 |
| 2009/0226080 A1 * | 9/2009 | Boyd | G06F 3/04815 382/154 |
| 2010/0127971 A1 | 5/2010 | Ellenby | |

(Continued)

*Primary Examiner* — Chau T Nguyen
(74) *Attorney, Agent, or Firm* — Blank Rome LLP

(57) ABSTRACT

Systems, methods, and computer readable media for selectively placing an application into a reduced-priority rendering mode during system user interface (UI) operations are described. Techniques disclosed herein transition an executing (foreground) application from a synchronous render mode (having a first render priority) to an asynchronous render mode (having a second, lower, render priority) when the system moves from supporting execution of the application into displaying a system UI. In this new state, the application's UI display element (e.g., an icon or reduced size viewing window) may continue to be updated (e.g., in accordance with the lower render priority) but does not interfere with the system UI's responsiveness.

30 Claims, 4 Drawing Sheets

(56) References Cited

U.S. PATENT DOCUMENTS

| | | | | |
|---|---|---|---|---|
| 2012/0131495 A1* | 5/2012 | Goossens | ............. | G06F 3/0482 |
| | | | | 715/782 |
| 2013/0301482 A1* | 11/2013 | Katis | ................... | H04L 65/1083 |
| | | | | 370/276 |
| 2014/0157160 A1* | 6/2014 | Cudak | ................. | G06F 3/04886 |
| | | | | 715/766 |
| 2015/0088968 A1* | 3/2015 | Wei | ........................ | G06F 40/14 |
| | | | | 709/203 |
| 2016/0292815 A1 | 10/2016 | Bell | | |
| 2017/0293494 A1* | 10/2017 | Long | ....................... | G06F 9/451 |

* cited by examiner

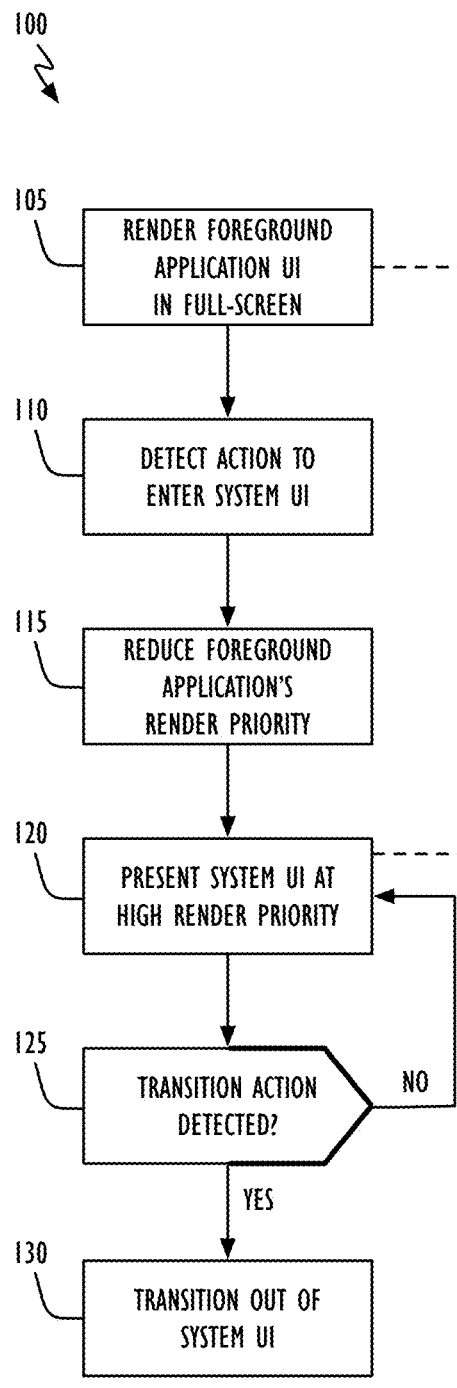
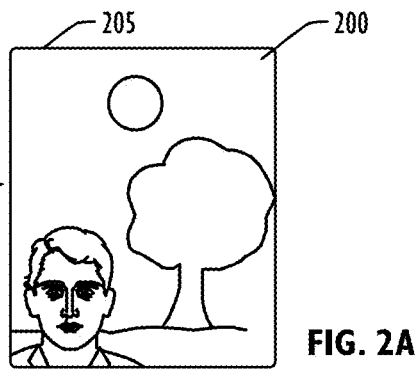
FIG. 2A
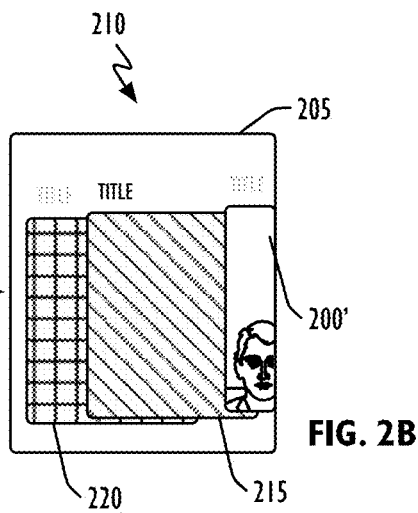
FIG. 2B
FIG. 1

SELECTIVE RENDERING MODE

BACKGROUND

This disclosure relates generally to computer-based display systems. More particularly, but not by way of limitation, this disclosure relates to selectively assigning an application a reduced-priority rendering mode when transitioning from that application to a system user interface (UI) so that the system UI remains responsive while also permitting the application visual representation within the system UI to be periodically updated.

A high render priority can be used to quickly render high priority content to a display element. This can make the underlying system feel quick and responsive to user input. One drawback to this approach is that there is a large memory overhead to render multiple targets in high priority.

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment the disclosed concepts provide a method to selectively alter or change the render priority of applications when transitioning into and out of a system interface. The methods can include rendering, at a high render priority (e.g., in a "synchronous render mode"), a first (e.g., foreground) application's full-screen user interface to a display element of an electronic device; receiving, while rendering the first application's full-screen user interface, a first request to switch to a system user interface (a "Home" page or a "Multi-Tasking" user interface); adjusting, in response to the first request, the first application's render priority to a lower render priority (e.g., placing the first application into an "asynchronous render mode"); rendering, at the high render priority, the system user interface as a full-screen user interface to the display element, the system user interface including a representation of the first application (e.g., an icon or reduced-sized view), the representation visually updated in accordance with the lower render priority (e.g., the asynchronous render mode); receiving, while rendering the system user interface as a full-screen user interface, a second request to switch from the system user interface to a second application's full-screen user interface; adjusting, in response to the second request, the second application's render priority to the lower render priority (e.g., in accordance with the asynchronous render mode); transitioning, in response to the second request, from the system user interface to the second application's full-screen user interface; and adjusting, concomitant with transitioning to the second application's full-screen user interface, the second application's render priority to the high render priority In some embodiments, the first and second applications may be the same application. In other embodiments the second application may be a second system user interface (e.g., such as when transition from a "Home" page to a "Multi-Tasking" system interface). In one or more other embodiments if the second application is different from the first application, the first application may be suspended or in another manner placed into a background state after the second application is selected. In yet another embodiment, when the first and second applications are different a snapshot of the first application may be captured that visually represents the status of the first application at the time the snapshot was captured. In still other embodiments, the various methods described herein may be embodied in computer executable program code and stored in a non-transitory storage device. In yet another embodiment, the method may be implemented in an electronic device having display capabilities.

BRIEF DESCRIPTION OF THE DRAWINGS

FIG. 1 shows, in flowchart form, a selective render mode operation in accordance with one or more embodiments.

FIGS. 2A and 2B illustrate an application-to-system user interface transition operation in accordance with one or more embodiments.

DETAILED DESCRIPTION

Figure 3:
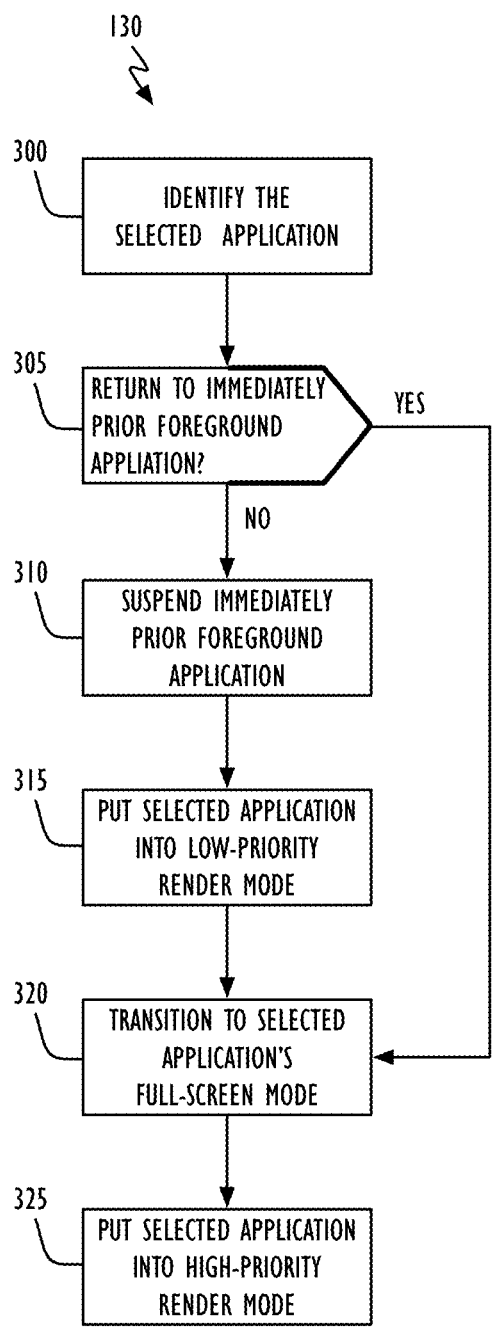
FIG. 3 shows, in flowchart form, a system user interface exit operation in accordance with one or more embodiments.

This disclosure pertains to systems, methods, and computer readable media to improve the operation of computer-based display systems. In general, techniques are disclosed for selectively placing an application into a reduced-priority rendering mode during system user interface (UI) operations. More particularly, techniques disclosed herein transition an executing application from a synchronous render mode (having a first render priority) to an asynchronous render mode (having a second, lower, render priority) when the system moves from supporting execution of the application into displaying a system UI. In this new state, the application's UI display element (e.g., an icon or reduced size viewing window) may continue to be updated, but in a manner that does not interfere with the responsiveness of the system UI. The disclosed techniques ensures that users are given a system UI that rapidly responds to their input (e.g., application or icon selection) while also providing visual feedback that the last used application is still operational.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of computer-based display systems having the benefit of this disclosure.

In the following description, the illustrative system will be assumed to be a mobile or embedded operating system executing with limited computational resources (e.g., computational power or capability and memory) on a portable device. Illustrative portable devices include, but are not limited to, mobile telephones, personal entertainment devices and tablet computer systems. Such systems often have limited capability to execute applications in the background for a variety of reason. For example, allowing an unlimited number of executing background applications could dramatically reduce the device's battery-life. In addition, background applications can interfere with the operation of foreground applications, especially those that require real-time response to user input.

Referring to FIGS. 1 and 2, selective render mode operation 100 renders a foreground (active) application in full-screen (block 105). Referring to FIG. 2A, and by way of example only, foreground application 200 renders a full-screen UI to display screen 205. The foreground application (e.g., application 200) may continue to do so until an input is received that indicates the system should transition to a system UI (block 110). For example, a user could select or activate a physical button or touch the display at a specific location or in a specified pattern (if the display is touch sensitive). At that time, the foreground application's rendering priority (e.g., a priority used by the operating system's rendering engine for thread scheduling) may be reduced (block 115) and the system UI presented or rendered using a high render priority (block 120). In one or more embodiments, applications having a high render priority may be said to be in a "synchronous render mode" and applications not having a high render priority may be said to be in an "asynchronous render mode." Referring to FIG. 2B, illustrative system UI 210 includes reduced-size display regions 200', 215 and 220 and their corresponding titles. Here, region 200' represents immediately prior foreground application 200 and regions 215 and 220 represent two additional prior foreground applications. In some embodiments, the immediately prior foreground application (e.g., application 200) may have its system UI display region (e.g., region 200') periodically updated in accordance with the application's asynchronous render mode priority. For example, if application 200 represents a video or movie, region 200' in system UI 210 may be periodically updated to show the movie's progress in accordance with the application's new render priority (i.e., that assigned in accordance with block 115). In one or more embodiments, applications other than the immediately prior foreground application (e.g., application 200), may have their system UI regions (e.g., 215 and 220) display a snapshot of the application's status. This snapshot may, for example, represent the applicant's last render update. In still other embodiments, regions 215 and 220 may be updated in accordance with yet a different—and lower—render priority than that discussed so far. Until an input is received indicating an exit from the system UI is desired (the "NO" prong of block 125), the system UI may be continually displayed. When such an input is received (the "YES" prong of block 125), the system UI may be transitioned to that application (or other user interface) selected from system UI 210 (block 130).

Referring to FIG. 3, system UI exit operation 130 begins by determining which application was selected to make foreground (block 300). If the immediately prior foreground application was not selected (the "NO" prong of block 305), the immediately prior foreground application may be suspended (block 310). In one embodiment, when in a suspended state the application does not execute. In still other embodiments, a suspended application may still get scheduled for execution, but at a priority that does not consume much battery power. In yet other embodiments, a snapshot (e.g., image) of the application's status may be captured concomitantly with suspending the application. This snapshot may, for example, be used to represent the application the next time the system UI is entered. Once the immediately prior foreground application is suspended, the selected application may be assigned to the asynchronous render mode (block 315). At this point, the selected application's system UI region in the system UI (e.g., region 220 in FIG. 2B) may be updated—it depends on how long it takes to actually transition out of the system UI and the rendering engine's availability for a thread of the selected application. The selected application may then be transitioned to the full-screen mode (block 320), where after the selected application may be placed into the high, or synchronous render mode (block 325). In another embodiment, one system UI could transition to another system UI rather than to an application.

Figure 4:
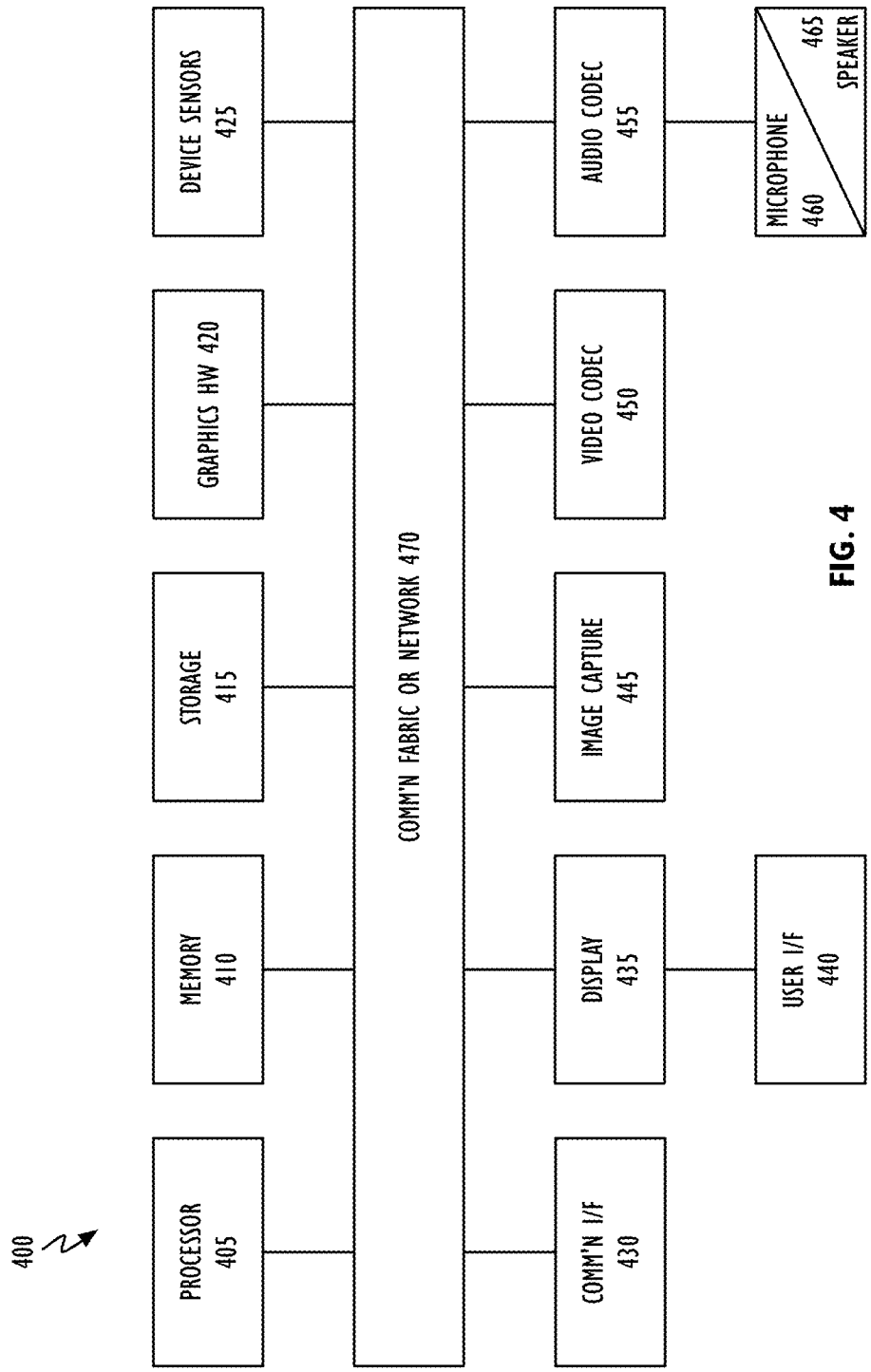
FIG. 4 shows, in block diagram form, a multi-function electronic device in accordance with one or more embodiments.

Referring to FIG. 4, a simplified functional block diagram of illustrative electronic device 400 capable of performing the disclosed selective render mode operations is shown according to one or more embodiments. Electronic device 400 could be, for example, a mobile telephone, personal media device or a tablet computer system. As shown, electronic device 400 may include processor element or module 405, memory 410, one or more storage devices 415, graphics hardware 420, device sensors 425, communication interface 430, display element 435 and associated user interface 440 (e.g., for touch surface capability), image capture circuit or unit 445, one or more video codecs 450, one or more audio codecs 455, microphone 460 and one or more speakers 465—all of which may be coupled via system bus, backplane, fabric or network 470 which may be comprised of one or more switches or continuous (as shown) or discontinuous communication links.

Processor module 405 may include one or more processing units each of which may include at least one central processing unit (CPU) and zero or more graphics processing units (GPUs); each of which in turn may include one or more processing cores. Each processing unit may be based on reduced instruction-set computer (RISC) or complex instruction-set computer (CISC) architectures or any other suitable architecture. Processor module 405 may be a single processor element, a system-on-chip, an encapsulated collection of integrated circuits (ICs), or a collection of ICs affixed to one or more substrates. Memory 410 may include one or more different types of media (typically solid-state). For example, memory 410 may include memory cache, read-only memory (ROM), and/or random access memory (RAM). Storage 415 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 410 and storage 415 may be used to retain media (e.g., audio, image and video files), preference information, device profile information, computer program instructions or code organized into one or more modules and written in any desired computer programming language, and any other suitable data. When executed by, for example, processor module 405 and/or graphics hardware 420 such computer program code may implement one or more of the selective render mode operations described herein. Graphics hardware 420 may be special purpose computational hardware for processing graphics and/or assisting processor module 405 perform computational tasks. In one embodiment, graphics hardware 420 may include one or more GPUs, and/or one or more programmable GPUs and each such unit may include one or more processing cores. In another embodiment, graphics hardware 420 may include one or more custom designed graphics engines or pipelines. Such engines or pipelines may be driven, at least in part, through software or firmware. Device sensors 425 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor, an electrostatic sensor, a temperature or heat sensor, a pixel array and a momentum sensor. Communication interface 430 may be used by electronic device 400 to connect to or communicate with one or more networks or other devices. Illustrative networks include, but are not limited to, a local network such as a Universal Serial Bus (USB) network, an organization's local area network (LAN), and a wide area network (WAN) such as the Internet. Communication interface 430 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Display element 435 may be used to display text and graphic output as well as receiving user input via user interface 440. For example, display element 435 may be a touch-sensitive display screen. User interface 440 can also take a variety of forms such as a button, keypad, dial, a click wheel, and keyboard. Image capture circuit or module 445 may capture still and video images. By way of example, application and system UIs in accordance with this disclosure (e.g., application display 200 and system UI 210), may be presented to a user via display 435, and a user's selection in accordance with block 300 of FIG. 3 may be made via user interface 440. Output from image capture unit 445 may be processed, at least in part, by video codec 450 and/or processor module 405 and/or graphics hardware 420, and/or a dedicated image processing unit incorporated within image capture unit 445. Images so captured may be stored in memory 410 and/or storage 415. Audio signals obtained via microphone 460 may be, at least partially, processed by audio codec 455. Data so captured may be stored in memory 410 and/or storage 415 and/or output through speakers 465.

Figure 5:
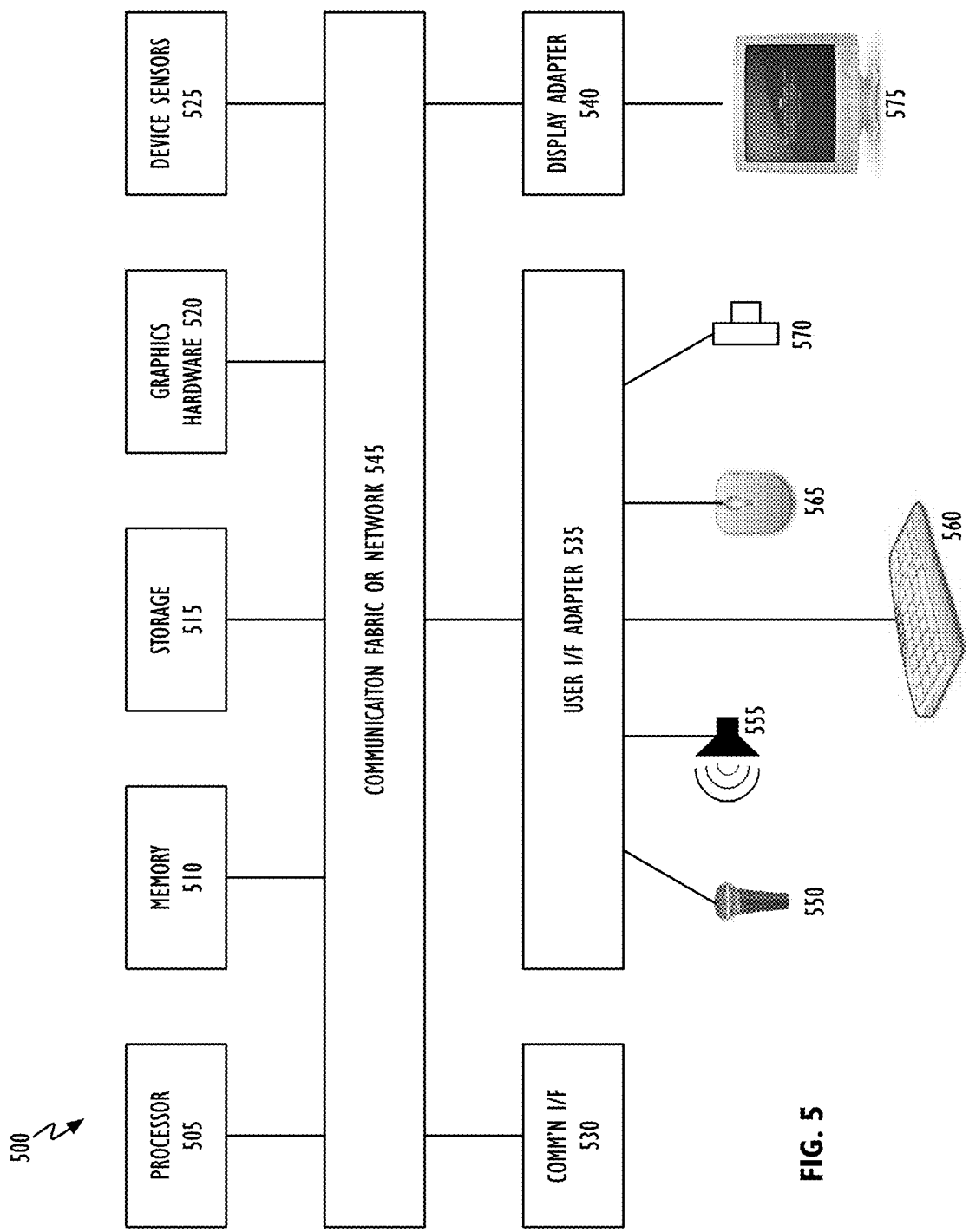
FIG. 5 shows, in block diagram form, a computer system in accordance with one or more embodiments.

Referring to FIG. 5, the disclosed selective render mode operations may also be performed by representative computer system 500 (e.g., a general purpose computer system such as a desktop, laptop or notebook computer system). Computer system 500 may include processor element or module 505, memory 510, one or more storage devices 515, graphics hardware element or module 520, device sensors 525, communication interface module or circuit 530, user interface adapter 535 and display adapter 540—all of which may be coupled via system bus, backplane, fabric or network 545 which may be comprised of one or more switches or one or more continuous (as shown) or discontinuous communication links. Processor module 505, memory 510, storage devices 515, graphics hardware 520, device sensors 525, communication interface 530, communication fabric or network 545 and display element 575 may be of the same or similar type and serve the same function as the similarly named component described above with respect to electronic device 400. User interface adapter 535 may be used to connect microphone(s) 550, speaker(s) 555, keyboard 560 (or other input devices such as a touch-sensitive element), pointer device(s) 565, and an image capture element 570 (e.g., an embedded image capture device). Display adapter 540 may be used to connect one or more display units 575.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). By way of example only, two (or more) applications could be rendered at a high priority to a display unit at the same time when a request to enter a system UI is received. In such a case both (or all) applications could be put into a lower render priority while the system UI is rendered at high priority. Embodiments like this could render both (or all) of the applications' reduced-size display windows (or icons) updated during system UI presentation; albeit at the lower render priority. Accordingly, the specific arrangement of steps or actions shown in FIGS. 1 and 3 or the arrangement of elements shown in FIGS. 4 and 5 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A selective render mode method, comprising:
  rendering, according to a higher render priority, a first application user interface to a display element of an electronic device, wherein the higher render priority increases scheduling priority of a related thread to a rendering engine;
  receiving, while rendering the first application user interface, a first request to switch to a system user interface;
  adjusting, in response to the first request, the first application user interface's render priority to a lower render priority, wherein the lower render priority decreases scheduling priority of the related thread to the rendering engine without suspending the related thread;

rendering to periodically update, according to the higher render priority, the system user interface to the display element, the system user interface including a representation of the first application user interface with the lower render priority and a representation of a second application user interface in a suspended state, the representation of the first application user interface is updated within the system user interface according to the lower render priority, and the representation of the second application user interface is updated within the system user interface less often than the representation of the first application user interface.

2. The selective render mode method of claim 1, wherein rendering a first application user interface comprises rendering the first application user interface as a full-screen user interface.

3. The selective render mode method of claim 1, wherein rendering the system user interface to the display element comprises rendering the system user interface as a full-screen user interface.

4. The selective render mode method of claim 1, further comprising:
   receiving, while rendering the system user interface, a second request to switch from the system user interface to the second application user interface;
   adjusting, in response to the second request, the second application user interface from the suspended state to the lower render priority;
   transitioning, in response to the second request, from the system user interface to the second application user interface; and
   adjusting, concomitant with transitioning to the second application user interface, the second application user interface's render priority to the higher render priority,
   wherein transitioning from the system user interface to the second application user interface comprises transitioning from the system user interface to a full-screen user interface of the second application user interface.

5. The selective render mode method of claim 4, wherein the first and second application user interfaces are related to different applications, and wherein the rendering priority of the representations of the first and second application user interfaces within the system user interface varies according to which of the first and second application user interfaces was rendered with the higher render priority more recently.

6. The selective render mode method of claim 5, further comprising suspending the first application user interface when adjusting the second application user interface's render priority to the lower render priority.

7. The selective render mode method of claim 6, further comprising:
   when suspending the first application user interface, capturing a visual snapshot of the first application user interface based on a status of the first application user interface when the snapshot is captured; and
   using the snapshot for the representation of the first application user interface within the system user interface.

8. The selective render mode method of claim 4, further comprising rendering to periodically update, at the higher render priority, a third application user interface to the display element of the electronic device when rendering a first application user interface to the display element.

9. The selective render mode method of claim 8, further comprising adjusting the third application user interface's render priority to the lower render priority when adjusting, in response to the first request, the first application user interface's render priority to the lower render priority.

10. The selective render mode method of claim 1, wherein the representation of the first application user interface is a first icon within a larger window corresponding to the system user interface, wherein the representation of the second application user interface is a second icon within the larger window corresponding to the system user interface, and wherein the first icon is updated more often than the second icon within the system user interface.

11. The selective render mode method of claim 1, wherein the representation of the first application user interface is a first reduced-size viewing window within a larger window corresponding to the system user interface, wherein the representation of the second application user interface is a second reduced-size viewing window within the larger window corresponding to the system user interface, and wherein the first reduced-size viewing window is updated more often than the second reduced-size viewing window within the system user interface.

12. A non-transitory storage device comprising instructions stored thereon to cause one or more processors to:
   render to periodically update, according to a higher render priority, a first application user interface to a display element of an electronic device, wherein the higher render priority increases scheduling priority of a related thread to a rendering engine;
   receive, while rendering the first application user interface, a first request to switch to a system user interface;
   adjust, in response to the first request, the first application user interface's render priority to a lower render priority, wherein the lower render priority decreases scheduling priority of the related thread to the rendering engine without suspending the related thread;
   render to periodically update, according to the higher render priority, the system user interface to the display element, the system user interface including a representation of the first application user interface and a representation of a second application user interface, the representation of the first application user interface is updated within the system user interface according to the lower render priority, and the representation of the second application user interface is updated within the system user interface less often than the representation of the first application user interface.

13. The non-transitory storage device of claim 12, wherein the instructions to render a first application user interface comprise instructions to render the first application's user interface as a full-screen user interface.

14. The non-transitory storage device of claim 12, wherein the instructions to render the system user interface to the display element comprise instructions to render the system user interface as a full-screen user interface.

15. The non-transitory storage device of claim 12, wherein the instructions cause one or more processors to:
   receive, while rendering the system user interface, a second request to switch from the system user interface to second application user interface;
   adjust, in response to the second request, the second application user interface from the suspended state to the lower render priority;
   transition, in response to the second request, from the system user interface to the second application user interface; and adjust, concomitant with transitioning to the second application user interface, the second application user interface's render priority to the higher render priority, wherein the instructions to transition from the system user interface to the second application user interface comprise instructions to transition from the system user interface to a full-screen user interface of the second application user interface.

16. The non-transitory storage device of claim 15, wherein the first and second application user interfaces are related to different applications, and wherein the rendering priority of the representations of the first and second application user interfaces within the system user interface varies according to which of the first and second application user interfaces was rendered with the higher render priority more recently.

17. The non-transitory storage device of claim 16, further comprising instructions to suspend the first application user interface when adjusting the second application user interface's render priority to the lower render priority.

18. The non-transitory storage device of claim 17, further comprising instructions to:
when suspending the first application user interface, capture a visual snapshot of the first application user interface based on a status of the first application user interface when the snapshot is captured; and
use the snapshot for the representation of the first application user interface within the system user interface.

19. The non-transitory storage device of claim 12, wherein the representation of the first application user interface is a first icon within a larger window corresponding to the system user interface, wherein the representation of the second application user interface is a second icon within the larger window corresponding to the system user interface, and wherein the first icon is updated more often than the second icon within the system user interface.

20. The non-transitory storage device of claim 12, wherein the representation of the first application user interface is a first reduced-size viewing window within a larger window corresponding to the system user interface, wherein the representation of the second application user interface is a second reduced-size viewing window within the larger window corresponding to the system user interface, and wherein the first reduced-size viewing window is updated more often than the second reduced-size viewing window within the system user interface.

21. An electronic device, comprising:
a display element;
a memory operatively coupled to the display element; and
one or more processors operatively coupled to the display element and the memory, the one or more processors configured to execute program instructions stored in the memory, the program instructions configured to cause the electronic device to—
render to periodically update, at a higher render priority, a first application user interface to the display element, wherein the higher render priority increases scheduling priority of a related thread to a rendering engine,
receive, while rendering the first application user interface, a first request to switch to a system user interface,
adjust, in response to the first request, the first application user interface's render priority to a lower render priority, wherein the lower render priority decreases scheduling priority of the related thread to the rendering engine without suspending the related thread,
render to periodically update, at the higher render priority, the system user interface to the display element, the system user interface including a representation of the first application user interface and a representation of a second application user interface, the representation of the first application user interface is updated within the system user interface according to the lower render priority, and the representation of the second application user interface is updated within the system user interface less often than the representation of the first application user interface.

22. The electronic device of claim 21, wherein the instructions to render a first application user interface comprise instructions to render the first application user interface as a full-screen user interface.

23. The electronic device of claim 21, wherein the instructions to render the system user interface to the display element comprise instructions to render the system user interface as a full-screen user interface.

24. The electronic device of claim 21, wherein the program instructions are configured to cause the electronic device to:
receive, while rendering the system user interface, a second request to switch from the system user interface to the second application user interface,
adjust, in response to the second request, the second application user interface's render priority to the lower render priority,
transition, in response to the second request, from the system user interface from the suspended state to the second application user interface, and
adjust, concomitant with the transition to the second application user interface, the second application user interface's render priority to the higher render priority,
wherein the instructions to transition from the system user interface to the second application user interface comprise instructions to transition from the system user interface to a full-screen user interface of the second application user interface.

25. The electronic device of claim 24, wherein the first and second application user interfaces are related to different applications, and wherein the rendering priority of the representations of the first and second application user interfaces within the system user interface varies according to which of the first and second application user interfaces was rendered with the higher render priority more recently.

26. The electronic device of claim 25, further comprising instructions to cause the electronic device to suspend the first application user interface when adjusting the second application user interface's render priority to the lower render priority.

27. The electronic device of claim 26, further comprising instructions to:
when suspending the first application user interface, capture a visual snapshot of the first application user interface based on a status of the first application user interface when the snapshot is captured; and
use the snapshot for the representation of the first application user interface within the system user interface.

28. The electronic device of claim 21, wherein one of the one or more processors comprise a graphics processing unit.

29. The electronic device of claim 21, wherein the representation of the first application user interface is a first icon within a larger window corresponding to the system user interface, wherein the representation of the second application user interface is a second icon within the larger window corresponding to the system user interface, and wherein the first icon is updated more often than the second icon within the system user interface.

30. The electronic device of claim 21, wherein the representation of the first application user interface is a first reduced-size viewing window within a larger window corresponding to the system user interface, wherein the representation of the second application user interface is a second reduced-size viewing window within the larger window corresponding to the system user interface, and wherein the first reduced-size viewing window is updated more often than the second reduced-size viewing window within the system user interface.

* * * * *